(12) United States Patent
Moroz et al.

(10) Patent No.: US 7,118,339 B2
(45) Date of Patent: Oct. 10, 2006

(54) METHODS AND APPARATUS FOR REDUCTION OF ASYMMETRIC ROTOR LOADS IN WIND TURBINES

(75) Inventors: Emilian Mieczyslaw Moroz, San Diego, CA (US); Kirk Gee Pierce, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 10/881,244

(22) Filed: Jun. 30, 2004

(65) Prior Publication Data

US 2006/0002792 A1  Jan. 5, 2006

(51) Int. Cl.
*F03D 7/04* (2006.01)

(52) U.S. Cl. ............... 416/1; 416/9; 415/4.3

(58) Field of Classification Search ........... 415/4.3; 290/44; 416/1, 9
See application file for complete search history.

(56) References Cited

U.S. PATENT DOCUMENTS

| | | | |
|---|---|---|---|
| 4,298,313 A * | 11/1981 | Hohenemser | ............... 416/43 |
| 4,915,590 A | 4/1990 | Eckland et al. | |
| 5,140,856 A * | 8/1992 | Larsen | ............... 416/144 |
| 5,669,758 A | 9/1997 | Williamson | |
| 6,503,058 B1 | 1/2003 | Selig et al. | |
| 6,514,043 B1 | 2/2003 | Rasmussen et al. | |
| 6,705,838 B1 | 3/2004 | Bak et al. | |
| 2002/0000723 A1 | 1/2002 | Weitkamp | |
| 2002/0067274 A1 | 6/2002 | Haller | |
| 2003/0127862 A1 | 7/2003 | Weitkamp | |
| 2003/0230898 A1 | 12/2003 | Jamieson et al. | |

FOREIGN PATENT DOCUMENTS

| WO | WO 200079128 A1 * | 12/2000 |
|---|---|---|
| WO | WO 01/33075 A1 | 5/2001 |

OTHER PUBLICATIONS

T. Rovio, H. Viriala, L. Soderlund, J. Kriikka; "Axial and Radial Flux Generators in Small-Scale Wind Power Production"; *Institute of Electromagnetics*, Tampere University of Technology, Finland, Date Unknown.

* cited by examiner

*Primary Examiner*—Edward K. Look
*Assistant Examiner*—Richard A. Edgar
(74) *Attorney, Agent, or Firm*—James E. McGinness, Esq.; Armstrong Teasdale LLP

(57) ABSTRACT

A method for reducing load and providing yaw alignment in a wind turbine includes measuring displacements or moments resulting from asymmetric loads on the wind turbine. These measured displacements or moments are used to determine a pitch for each rotor blade to reduce or counter asymmetric rotor loading and a favorable yaw orientation to reduce pitch activity. Yaw alignment of the wind turbine is adjusted in accordance with the favorable yaw orientation and the pitch of each rotor blade is adjusted in accordance with the determined pitch to reduce or counter asymmetric rotor loading.

28 Claims, 4 Drawing Sheets

METHODS AND APPARATUS FOR REDUCTION OF ASYMMETRIC ROTOR LOADS IN WIND TURBINES

STATEMENT REGARDING FEDERALLY SPONSORED RESEARCH & DEVELOPMENT

The U.S. Government has certain rights in this invention as provided for by the terms of Contract No. DE-AC36-83CH10093, Subcontract No. ZAM-7-13320-26 awarded by the Department of Energy/Midwest Research Institute, National Renewable Energy Laboratory Division.

BACKGROUND OF THE INVENTION

This invention relates generally to wind turbines, and more particularly to methods and apparatus for efficiently reducing load in wind turbines.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid. Some turbines utilize generators that are directly coupled to the rotor without using a gearbox.

Asymmetric loading across wind turbine rotor occurs due to vertical and horizontal wind shears, yaw misalignment, and turbulence. Horizontal wind shears, yaw misalignment, and natural turbulence are among the primary drivers of asymmetric loads on a wind turbine rotor. These loads, along with the loads from vertical and/or horizontal wind shears, are contributors to extreme loads and the number of fatigue cycles accumulated by a wind turbine system. Asymmetric load control can be used to reduce the effects the extreme loads and fatigue cycles, but a considerable increase in pitch system activity is required for this type of control relative to standard collective pitch control alone.

BRIEF DESCRIPTION OF THE INVENTION

There is therefore provided, in some configurations of the present invention, a method for reducing load and providing yaw alignment in a wind turbine. The method includes measuring displacements or moments resulting from asymmetric loads on the wind turbine. These measured displacements or moments are used to determine a pitch for each rotor blade to reduce or counter asymmetric rotor loading and a favorable yaw orientation to reduce pitch activity. Yaw alignment of the wind turbine is adjusted in accordance with the favorable yaw orientation and the pitch of each rotor blade is adjusted in accordance with the determined pitch to reduce or counter asymmetric rotor loading.

In another aspect, the present invention provides a method for reducing load in a wind turbine that includes utilizing at least three sensors to measure displacements of main shaft flange resulting from asymmetric loads on the wind turbine. The measured displacements are used to determine a pitch for each rotor blade to reduce or counter asymmetric rotor loading and a favorable yaw orientation to reduce pitch activity. The method further includes adjusting yaw alignment of the wind turbine in accordance with the favorable yaw orientation and adjusting the pitch of each rotor blade in accordance with the determined pitch to reduce or counter asymmetric rotor loading.

In yet another aspect of the present invention, a wind turbine is provided that includes a rotor having a plurality of rotor blades and a hub. The wind turbine also includes a control system and a plurality of sensors configured to measure displacements or moments resulting from asymmetric loads on the wind turbine. The control system is configured to use the measured displacements or moments to determine a pitch for each rotor blade to reduce or counter asymmetric rotor loading and a favorable yaw orientation to reduce pitch activity. The control system is also configured to adjust yaw alignment of the wind turbine in accordance with the favorable yaw orientation and to adjust the pitch of each rotor blade in accordance with the determined pitch to reduce or counter asymmetric rotor loading.

In still another aspect, the present invention provides a wind turbine having a rotor having a plurality of rotor blades and a hub. The wind turbine also has a main shaft, a main shaft flange, a control system and at least three sensors configured to measure displacements of the main shaft flange resulting from asymmetric loads on the wind turbine. The control system is configured to use the measured displacements to determine a pitch for each rotor blade to reduce or counter asymmetric rotor loading and a favorable yaw orientation to reduce pitch activity. The control system is further configured to adjust yaw alignment of the wind turbine in accordance with the favorable yaw orientation; and adjust the pitch of each rotor blade in accordance with the determined pitch to reduce or counter asymmetric rotor loading.

In yet another aspect, the present invention provides a method for reducing load in a wind turbine that includes operating the wind turbine above a selected wind speed and introducing a yaw error effective to reduce asymmetric loading without adjusting pitch.

In still another aspect, the present invention provides a wind turbine configured to introduce a yaw error effective to reduce asymmetric loading without adjusting pitch when operating above a selected wind speed.

Configurations of the present invention will thus be seen to efficiently reduce the effects of extreme loads and fatigue cycles without unduly increasing pitch system activity. More particularly, pitch activity will be reduced below a level that would be needed for asymmetric load control in conventional configurations in which yaw orientation is not adjusted in an effective manner.

DETAILED DESCRIPTION OF THE INVENTION

The present invention relates to the efficient reduction of load in wind turbines. Technical effects of the present invention include a reduction in the effects of extreme loads and fatigue cycles without an undue increase in pitch system activity. Adjusting yaw in conjunction with blade pitch control reduces net asymmetric loading and hence, required pitch activity occuring in response to rotor load asymmetry. Yaw alignment is adjusted slowly towards a mean yaw orientation that reduces the pitch activity necessary to deal with prevailing atmospheric conditions and yet maintains energy capture. The pitch of each rotor blade is adjusted in accordance with a determined pitch angle to reduce asymmetric rotor loading, whilst regulating power or torque. In many configurations, pitch control is relatively faster than yaw control and thus is more actively used for asymmetric load reduction than is yaw alignment. However, some configurations use yaw control alone to reduce asymmetric loading in above rated winds.

Figure 1:
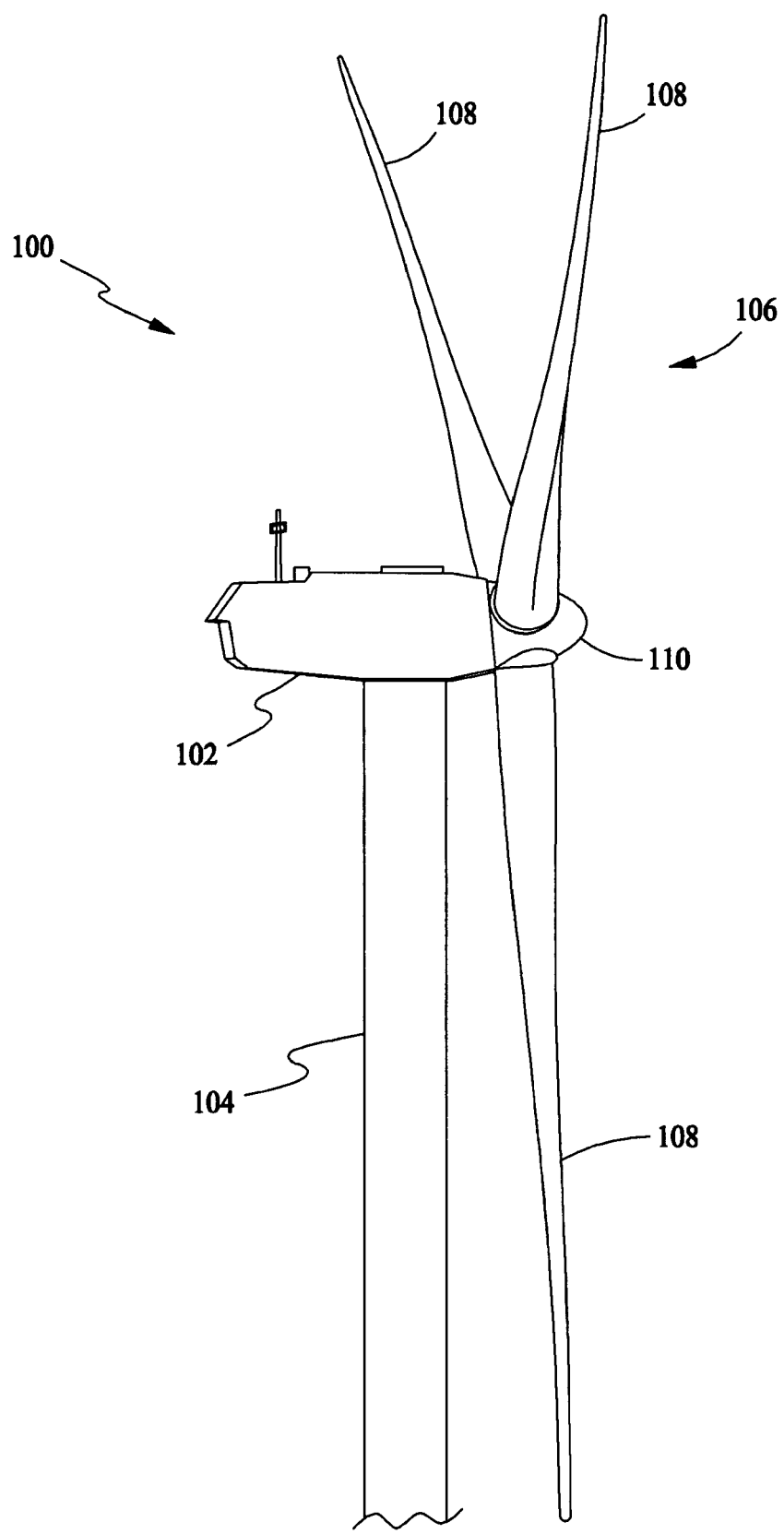
FIG. 1 is a drawing of an exemplary configuration of a wind turbine.

In some configurations and referring to FIG. 1, a wind turbine 100 in some configurations comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes a plurality of rotor blades 108 attached to a rotating hub 110. Although wind turbine 100 illustrated in FIG. 1 includes three rotor blades 108, there are no specific limits on the number of rotor blades 108 required by the present invention.

Figure 2:
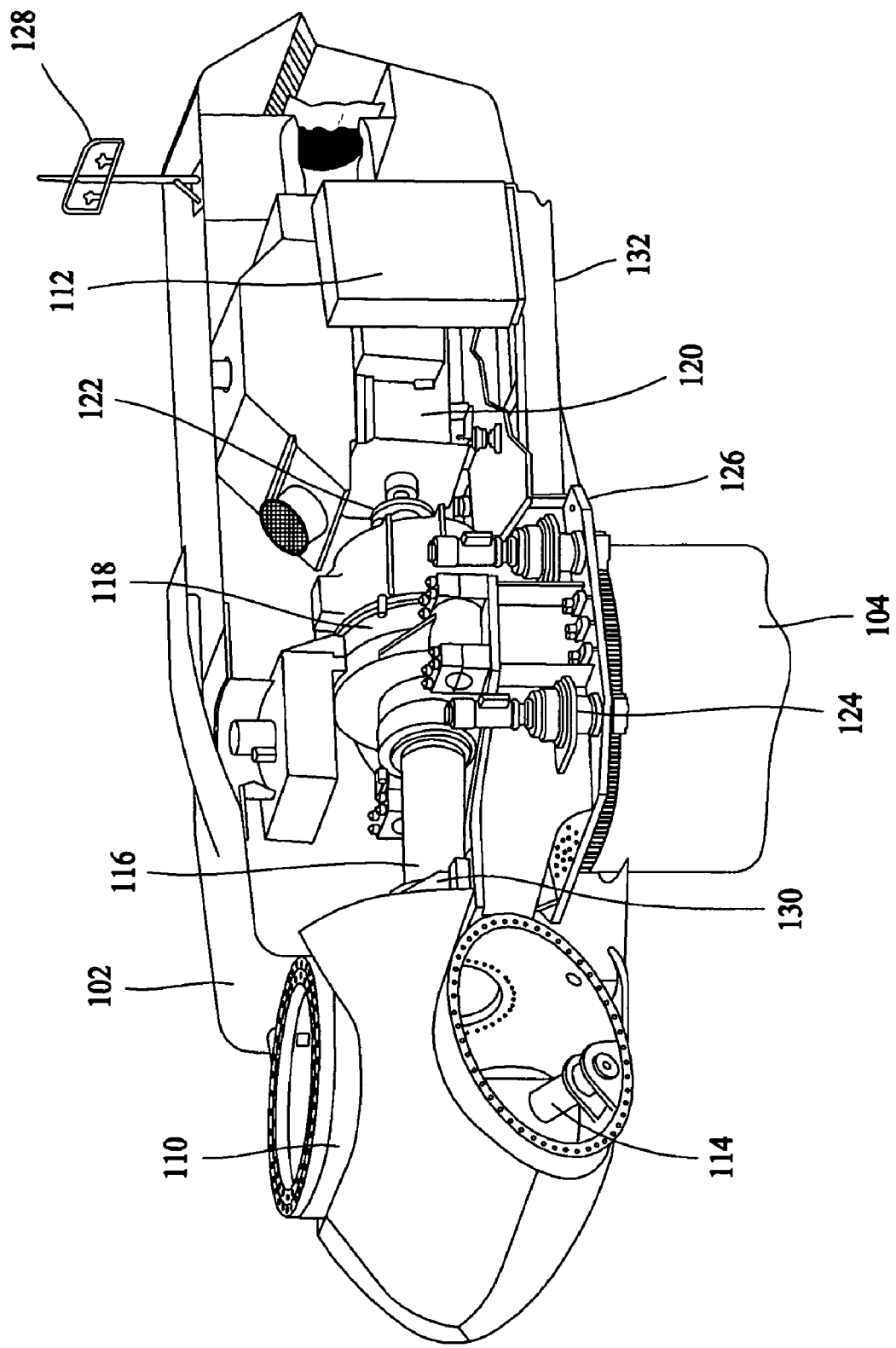
FIG. 2 is a cut-away perspective view of a the nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In some configurations, hub 110 receives three blades 108, but other configurations can utilize any number of blades. In some configurations, the pitches of blades 108 are individually controller by blade pitch drive 114. Hub 110 and blades 108 together comprise wind turbine rotor 106.

The drive train of the wind turbine includes a main rotor shaft 116 (also referred to as a "low speed shaft") connected to hub 110 and a gear box 118 that, in some configurations, utilizes a dual path geometry to drive a high speed shaft enclosed within gear box 118. The high speed shaft (not shown in FIG. 2) is used to drive generator 120. In some configurations, rotor torque is transmitted via coupling 122. Generator 120 may be of any suitable type, for example, a wound rotor induction generator. In some configurations of the present invention, a gear box is not used, and instead, the rotor shaft directly drives generator 120.

Yaw drive 124 and yaw deck 126 provide a yaw orientation system for wind turbine 100. In some configurations, the yaw orientation system is electrically operated and controlled by the control system in accordance with information received from sensors used to measure shaft flange displacement, as described below. However, a wind vane 128 may be provided as a back-up or redundant system for providing information for the yaw orientation system. In some configurations, the yaw system is mounted on a flange provided atop tower 104.

Figure 3:
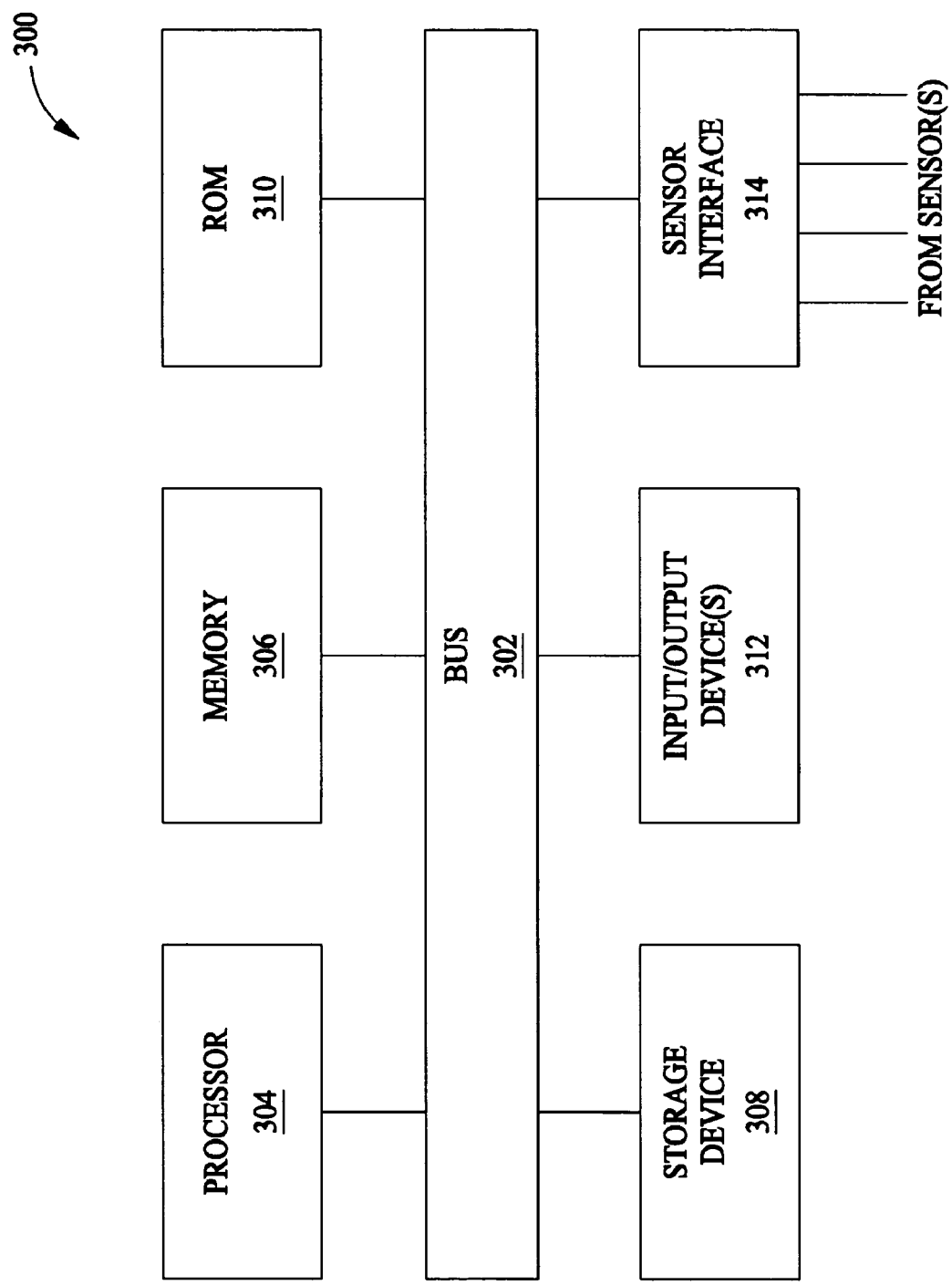
FIG. 3 is a block diagram of an exemplary configuration of a control system for the wind turbine configuration shown in FIG. 1.

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hardwired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

Figure 4:
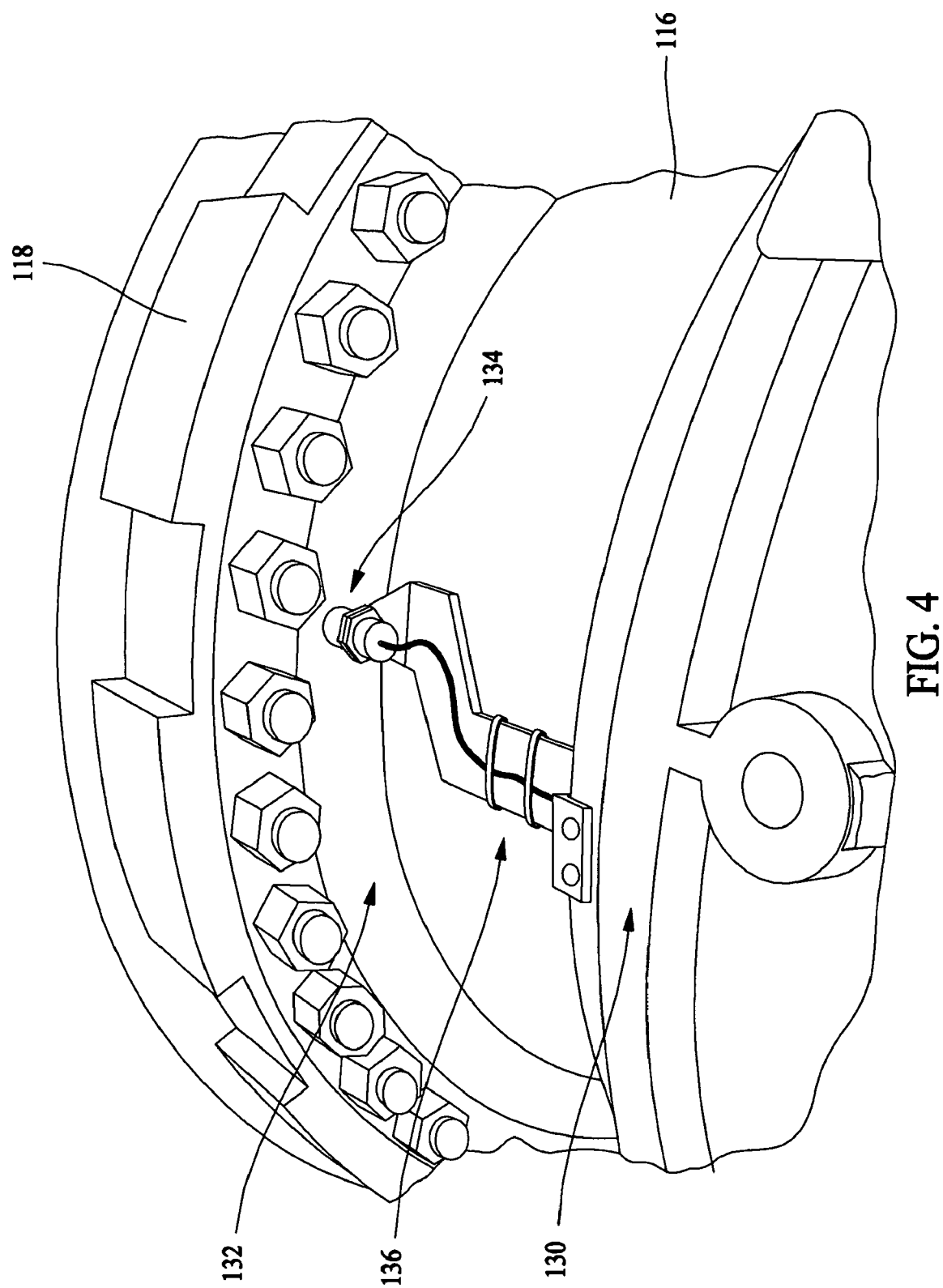
FIG. 4 is a perspective view of a portion of the main rotor shaft and a sensor used in some configurations of the present invention.

Asymmetric loads acting on wind turbine rotor blades 108 translate into moments acting on hub 110 and subsequently low speed shaft 116. Referring to FIG. 4, these moments are manifested as deflections or strains at main shaft flange 132. Sensors 134, such as proximity sensors, are utilized to measure main shaft flange 132 displacement. In some configurations, each sensor 134 is mounted on a sensor bracket 136 that is attached to main bearing 130. Sensor readings from sensors 134 indicating measured displacements or moments are used by the control system to determine a pitch command for each rotor blade 108 to reduce or counter asymmetric rotor loading and a favorable yaw orientation to reduce pitch activity. In some configurations, at least three sensors are used to measure displacements of main shaft flange 132 of wind turbine 100 resulting from asymmetric loads. Also in some configurations, sensors 134 are proximity sensors that measure main shaft flange 132 displacement relative to a non-deflecting reference frame, for example, main bearing 130. Some configurations utilize four sensors with 90 degree spacing to measure displacements of shaft flange 132.

A feedback control system is used in some configurations of the present invention to reduce asymmetric loads from acting on rotor 106, shaft 116, and being translated to other turbine components.

Cyclic pitching of blades 108 is used to reduce the effects of all shears and turbulence. However, in some configurations of the present invention, the amount of pitch activity and over all system loads are reduced by also using yaw control to minimize or eliminate contributions to rotor asymmetry as a result of yaw misalignment and horizontal wind shears. In addition, energy is maximized in some configurations by using the overall rotor 108 as a sensor for yaw misalignment rather than nacelle-mounted anemometer 128.

Asymmetric loading occurs as a result of vertical and horizontal wind shears, yaw misalignment, and turbulence. This loading translates into moments of hub 110 and low speed shaft 116. These moments manifest themselves as deflections or strains at the shaft 116 and moments acting at various locations across the wind turbine system.

In some configurations of the present invention, measurement of shaft 116 displacement or moments at other turbine locations caused by asymmetric loads are used as an indication of the magnitude of asymmetric loading. Signals representing these measurements are provided to sensor interface 314 and used by processor(s) 304 to determine a pitch command for each rotor blade 108 that is carried out utilizing pitch drive 114 and a favorable yaw orientation. Yaw drive 124 and yaw deck 126 are used to adjust yaw alignment of the wind turbine in accordance with the favorable yaw orientation using any suitable known classical or modern control technique known in the art so as to reduce asymmetric loads. Yaw regulation thus occurs on a relatively low frequency basis in some configurations of the present invention, and in some configurations is performed less frequently than the pitch adjustment of each rotor blade 108. Also, in some configurations, yaw regulation is implemented (for example, as software instructions stored in ROM 310 and executed by processor(s) 304) as a secondary control loop that acts to remove the effects of horizontal wind shear and any yaw misalignment that may be inducing asymmetric loads on rotor 106. The pitch system, which includes pitch drives 114, is thus relieved of having to deal with these effects, thereby reducing its level of activity. As a result, wear and tear, energy consumption, and costs associated with the pitch system are reduced. Also, replacement of nacelle mounted yaw (wind) vane-based wind alignment with rotor-based wind alignment can also provide increased energy capture in some configurations. However, a nacelle-mounted yaw (wind) vane 128 can be used as a back-up sensor for increased reliability in various configurations of the present invention.

Coordinate transformation, bias estimation methods, and/or other control techniques known in the art can be used in various configurations by control system 300 to determine a pitch increment for each rotor blade 108 to reduce or counter overall asymmetric rotor loading. A secondary control loop, utilizing information gained from the same sensor suite, evaluates a yaw alignment that can minimize the amount of pitch activity while maintaining or improving energy capture. The secondary control loop also gradually drives rotor 106 into the new yaw alignment orientation. In some configurations, a feedback loop drives maintains orientation in the best (or nearly the best) direction. In some configurations, separate feedback loops are used to adjust yaw alignment and to adjust pitch.

Highest wind shears may occur below rated wind speed and thus asymmetric blade pitch might be needed at below rated wind speeds or the wind turbine might benefit from a yaw orientation other than directly into the wind to help reduce the asymmetric loads that might occur. Therefore, in some configurations of the present invention, the wind turbine is operated above a selected wind speed (for example, operated at at least about 70% of rated wind speed, i.e., 70% of rated power, or in another configuration, at least above the rated wind speed) and introducing a yaw error effective to reduce asymmetric loading without adjusting pitch. The wind turbine can be configured to introduce the yaw error when it is operating above the selected wind speed.

In configurations in which yaw alone is used to counter atmospheric shears, "cyclic" pitch activity may be reduced to zero. Collective pitch activity may be required in some configurations when above rated wind speed to keep power levels within the bounds of the generator rating or such pitch activity may be required in some configurations to trim other loads, such as thrust loads near rated wind speed.

It will thus be appreciated that configurations of the present invention efficiently reduce the effects of extreme loads and fatigue cycles without unduly increasing pitch system activity. Additional functionality that can be provided in some configurations of the present invention include, but are not limited to, off-loading of yaw drives 124 through the use of yaw moments induced through cyclic pitch, providing precautionary shutdowns of the wind turbine in the case of extreme wind direction changes or at least changes in excess of a predetermined amount, providing redundancy for yaw orientation, and mitigating extreme loads due to projected area reduction. Various configurations of the present invention also reduce fatigue and extreme loads of the rotor blades and other turbine components.

While the invention has been described in terms of various specific embodiments, those skilled in the art will recognize that the invention can be practiced with modification within the spirit and scope of the claims.

What is claimed is:

1. A method for reducing load in a wind turbine having a rated wind speed, said method comprising operating the wind turbine above a selected wind speed and introducing a yaw error effective to reduce asymmetric loading without adjusting pitch.

2. A method in accordance with claim 1 wherein the selected wind speed is at least about 70% of the rated wind speed.

3. A method in accordance with claim 1 wherein the selected wind speed is the rated wind speed.

4. A wind turbine having a rated wind speed and configured to introduce a yaw error effective to reduce asymmetric loading without adjusting pitch when operating above a selected wind speed.

5. A wind turbine in accordance with claim 4 wherein the selected wind speed is at least about 70% of the rated wind speed.

6. A wind turbine in accordance with claim 4 wherein the selected wind speed is the rated wind speed.

7. A method for reducing load in a wind turbine, said method comprising:
   measuring displacements or moments resulting from asymmetric loads on the wind turbine;
   using said measured displacements or moments to determine a pitch for each rotor blade to reduce or counter asymmetric rotor loading and a favorable yaw orientation to reduce pitch activity;
   adjusting yaw alignment of the wind turbine in accordance with the favorable yaw orientation; and
   adjusting the pitch of each rotor blade in accordance with the determined pitch to reduce or counter asymmetric rotor loading.

8. A method in accordance with claim 7 wherein said determining a pitch for each rotor blade to reduce or counter asymmetric rotor loading further comprises utilizing a coordinate transformation to determine a pitch increment for each rotor blade.

9. A method in accordance with claim 7 wherein said determining a pitch for each rotor blade to reduce or counter asymmetric rotor loading further comprises utilizing a bias estimation to determine a pitch increment for each rotor blade.

10. A method in accordance with claim 7 further comprising utilizing separate feedback loops to adjust yaw alignment and to adjust pitch.

11. A method in accordance with claim 7 further comprising off-loading yaw drives utilizing yaw moments induced via cyclic pitch.

12. A method in accordance with claim 7 further comprising shutting down the wind turbine when wind direction changes in excess of a predetermined amount.

13. A method in accordance with claim 7 wherein said adjusting yaw alignment is performed less frequently than said adjusting the pitch of each rotor blade.

14. A method in accordance with claim 7 further comprising utilizing a nacelle mounted yaw (wind) vane as a redundant measurement to determine said favorable yaw orientation.

15. A method for reducing load in a wind turbine, said method comprising:
  utilizing at least three sensors to measure displacements of main shaft flange of the wind turbine resulting from asymmetric loads on the wind turbine;
  utilizing the measured displacements to determine a pitch for each rotor blade to reduce or counter asymmetric rotor loading and a favorable yaw orientation to reduce pitch activity;
  adjusting yaw alignment of the wind turbine in accordance with the favorable yaw orientation; and
  adjusting the pitch of each rotor blade in accordance with the determined pitch to reduce or counter asymmetric rotor loading.

16. A method in accordance with claim 15 wherein said utilizing at least three sensors comprises utilizing proximity sensors to measure main shaft flange displacements relative to a non-deflecting reference frame.

17. A method in accordance with claim 15 wherein said utilizing at least three sensors comprises utilizing at least four sensors with 90 degree spacing to measure displacements of a shaft flange of the wind turbine.

18. A wind turbine comprising a rotor having a plurality of rotor blades and a hub, said wind turbine also comprising a control system and a plurality of sensors configured to measure displacements or moments resulting from asymmetric loads on the wind turbine, said control system configured to:
  use said measured displacements or moments to determine a pitch for each rotor blade to reduce or counter asymmetric rotor loading and a favorable yaw orientation to reduce pitch activity;
  adjust yaw alignment of the wind turbine in accordance with the favorable yaw orientation; and
  adjust the pitch of each said rotor blade in accordance with the determined pitch to reduce or counter asymmetric rotor loading.

19. A wind turbine in accordance with claim 18 wherein said control system is further configured to utilize a coordinate transformation to determine a pitch increment for each rotor blade to reduce or counter asymmetric rotor loading.

20. A wind turbine in accordance with claim 18 wherein said control system is further configured to utilize a bias estimation to determine a pitch increment for each rotor blade to reduce or counter asymmetric rotor loading.

21. A wind turbine in accordance with claim 18 wherein said control system is further configured to utilize separate feedback loops to adjust yaw alignment and to adjust pitch.

22. A wind turbine in accordance with claim 18 further comprising yaw drives, and further configured to off-load yaw drives utilizing yaw moments induced via cyclic pitch.

23. A wind turbine in accordance with claim 18 wherein said control system is further configured to shut down the wind turbine when wind direction changes in excess of a predetermined amount.

24. A wind turbine in accordance with claim 18 wherein said control system is configured to adjust yaw alignment less frequently than the pitch of each rotor blade.

25. A wind turbine in accordance with claim 18 further comprising a nacelle mounted yaw (wind) vane configured as a redundant yaw sensor for determining said favorable yaw orientation.

26. A wind turbine comprising a rotor having a plurality of rotor blades and a hub, said wind turbine also comprising a main shaft, a main shaft flange, a control system and at least three sensors configured to measure displacements of said main shaft flange resulting from asymmetric loads on the wind turbine, said control system configured to:
  use said measured displacements to determine a pitch for each rotor blade to reduce or counter asymmetric rotor loading and a favorable yaw orientation to reduce pitch activity;
  adjust yaw alignment of the wind turbine in accordance with the favorable yaw orientation; and
  adjust the pitch of each said rotor blade in accordance with the determined pitch to reduce or counter asymmetric rotor loading.

27. A wind turbine in accordance with claim 26 wherein said at least three sensors comprise proximity sensors configured to measure main shaft flange displacements relative to a non-deflecting reference frame.

28. A wind turbine in accordance with claim 26 wherein said at least three sensors comprise at least four sensors with 90 degree spacing.

* * * * *